Figure 1:
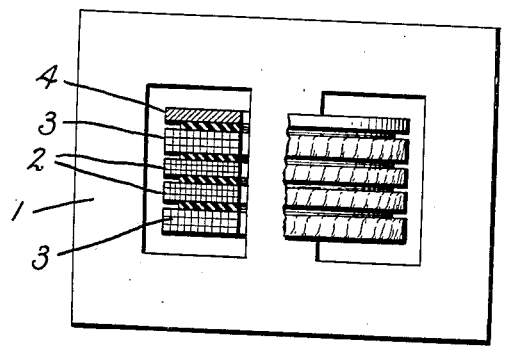

L. F. BLUME.
TERTIARY WINDING.
APPLICATION FILED JULY 11, 1913.

1,173,094.

Patented Feb. 22, 1916.

Witnesses
Anthony Mart
J. Ellis Glen

Inventor.
Louis F. Blume.
by
His Attorney.

UNITED STATES PATENT OFFICE

LOUIS F. BLUME, OF PITTSFIELD, MASSACHUSETTS, ASSIGNOR TO GENERAL ELECTRIC COMPANY, A CORPORATION OF NEW YORK.

TERTIARY WINDING.

1,173,094. Specification of Letters Patent. Patented Feb. 22, 1916.

Application filed July 11, 1913. Serial No. 778,515.

*To all whom it may concern:*

Be it known that I, LOUIS F. BLUME, a citizen of the United States, residing at Pittsfield, county of Berkshire, State of Massachusetts, have invented certain new and useful Improvements in Tertiary Windings, of which the following is a specification.

My invention relates to transformers in polyphase systems of distribution.

The object of my invention is to provide improved means for balancing the electromotive forces of the phases when the primaries and secondaries are respectively Y-connected.

It is often desirable to connect both the primaries and the secondaries of transformers in polyphase systems of distribution in Y, but with such connections there is considerable tendency toward unbalancing of the voltages due to unbalancing of the load or other causes. It has heretofore been proposed to add an auxiliary secondary winding to each set of primary and secondary windings and to connect these auxiliary secondary windings in delta to maintain the balance of the voltages of the phases. In such an arrangement the delta connection carries current on a tendency of the voltages to unbalance and resists, and substantially prevents, the unbalancing. The amount of current carried by these auxiliary secondary windings is normally small and for economic reasons these windings are made of small capacity.

So far as I am aware it has always heretofore been considered necessary to wind each auxiliary secondary coil in close inductive relation to its primary and secondary power coils so that the auxiliary secondary coils might be very sensitive to the current in the primary and secondary coils. In the case of very heavy unbalanced overload, as for example, a short-circuit on one phase of the secondary, the current carried by the auxiliary secondaries so wound is very high and as a result it has happened that the auxiliary secondary windings have been destroyed, more or less completely destroying the rest of the transformer or transformers. Various constructions have been proposed to prevent this; for example it has been proposed to open a switch in the secondary circuit by means of the excessive current in the auxiliary coils but this is undesirable because it results in dropping the load which might otherwise be avoided if the excess power currents could be carried for a short period of time.

Now I have discovered that it is not necessary to have the auxiliary secondary windings in close inductive relation to the primary and secondary power windings, but that even though the auxiliary secondary windings possess very considerable reactance with respect to the primary and secondary windings, they still retain the ability to maintain balanced voltages on the secondaries. The increased reactance which I have found can be given to the auxiliary secondary windings is sufficient to prevent the flow of excessive currents in the auxiliary secondary windings in cases of a short-circuit on the secondary side of the transformers so that it becomes unnecessary to provide any means for opening the circuit.

In certain constructions heretofore used the reactance of the auxiliary secondary coils has been about seven times the normal reactance of the transformers. In this case the auxiliary secondary windings were placed in the middle of the winding spaces of the cores. By placing the auxiliary windings at the ends of the winding spaces in the same kind of transformers, it becomes possible to increase their reactance to something like twenty-nine times the normal reactance of the transformers. This change obviously entails practically no increase in the first cost of the transformers and their normal operation is substantially the same in both cases; my invention, however, gives the additional factor of safety.

In the accompanying drawings which form a part of this specification, I have illustrated transformers involving my invention.

Figure 2:
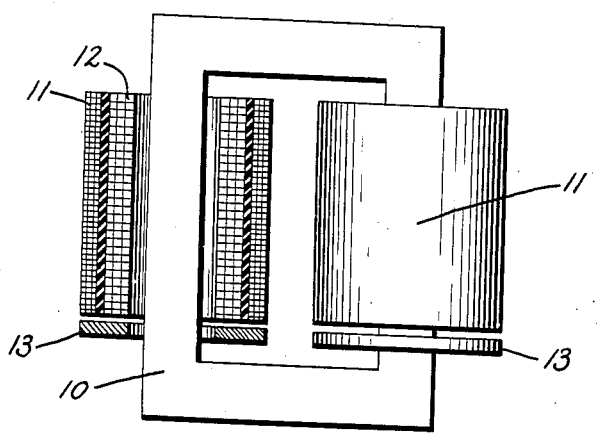
Figure 3:
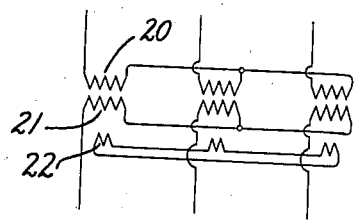

Figure 1 illustrates a shell type transformer involving my invention; Fig. 2 illustrates a core type transformer also involving my invention; and Fig. 3 illustrates diagrammatically the connection of the windings of a transformer or transformers involving my invention.

It is customary to use interchangeably a three phase transformer or three single phase transformers. The connections are similar in the two cases and my invention is applied in the same manner to three phase transformers and to single phase transformers when connected in three phase relationship.

In Fig. 1, I have illustrated a single phase shell type transformer with the tertiary winding so located as to possess considerable reactance as is required by my invention. The core 1 is of the common three-legged type. About the center leg is located the high tension winding 2 and the low tension winding 3, and also the auxiliary secondary winding 4. The high and low tension windings, which are the power windings, are well inter-wound to secure good magnetic linkage. The auxiliary secondary winding 4 is located at one end of the winding space, that is, at one end of the core containing the power coils, and hence possesses considerable reactance as will be understood.

Fig. 2 illustrates a core type transformer. The core 10 is of the usual two-legged type, each leg being surrounded by a high tension winding 11 and a low tension winding 12, one placed above the other. The tertiary winding 13 is here also located on one end of each leg and hence possessing considerable reactance as in the preceding case.

The connections whether a single three phase transformer or three single phase transformers are used, are the same as have been common heretofore: thus in Fig. 3 the primary windings 20 are Y-connected and the secondary windings 21 are Y-connected. The tertiary windings 22 are connected in delta and in Fig. 3 are located at some distance from the power windings 20 and 21 to indicate their high reactance.

It will be understood that it is not necessary that the reactance of the tertiary winding be obtained in exactly the way I have described it and it will be further understood that the available reactance values extend throughout a very considerable range.

What I claim as new and desire to secure by Letters Patent of the United States, is,—

1. In a system of distribution, the combination with Y-connected primary transformer coils and Y-connected secondary transformer coils, of delta connected auxiliary secondary transformer coils in poor inductive relation to said primary and secondary coils.

2. In a system of distribution, the combination with Y-connected primary transformer coils and Y-connected secondary transformer coils, of delta connected auxiliary secondary transformer coils respectively linked by the same magnetic circuits as the primary and secondary coils and located at one end only of the winding spaces in poor inductive relation to said primary and secondary coils.

In witness whereof, I have hereunto set my hand this 8th day of July, 1913.

LOUIS F. BLUME.

Witnesses:
A. K. NUGENT,
H. NUGENT.